United States Patent [19]

Grava

[11] Patent Number: 4,526,950

[45] Date of Patent: Jul. 2, 1985

[54] METHOD FOR PREPARING INTERPOLYMERS

[75] Inventor: Arturs Grava, Mayfield Hts., Ohio

[73] Assignee: The Lubrizol Corporation, Wickliffe, Ohio

[21] Appl. No.: 546,639

[22] Filed: Oct. 28, 1983

Related U.S. Application Data

[63] Continuation of Ser. No. 370,030, Apr. 20, 1982, abandoned.

[51] Int. Cl.$^3$ .............................................. C08F 24/00
[52] U.S. Cl. .................................... 526/272; 526/227; 526/324; 526/317; 549/233; 549/252; 560/190; 562/590
[58] Field of Search ............... 526/317, 324, 227, 272; 562/590; 560/190; 549/233, 252

[56] References Cited

U.S. PATENT DOCUMENTS

| | | | |
|---|---|---|---|
| Re. 28,475 | 7/1975 | Blecke et al. | 526/272 |
| 2,527,081 | 10/1950 | Ross et al. | 526/324 |
| 2,542,542 | 2/1951 | Lippincott et al. | 526/272 |
| 3,311,596 | 3/1967 | Berding et al. | 260/78.5 |
| 3,380,972 | 4/1968 | Le Blanc et al. | 526/272 |
| 3,393,168 | 7/1968 | Johnson et al. | 260/29.7 |
| 3,461,108 | 4/1969 | Heilman et al. | 526/272 |
| 3,560,455 | 2/1971 | Hazen et al. | 526/272 |
| 3,560,456 | 2/1971 | Hazen et al. | 526/272 |
| 3,560,457 | 2/1971 | Hazen et al. | 526/272 |
| 3,580,893 | 5/1971 | Heilman et al. | 526/272 |
| 3,642,726 | 2/1972 | Heilman | 260/78.5 |
| 3,706,704 | 12/1972 | Heilman | 526/272 |
| 3,729,451 | 4/1973 | Blecke et al. | 260/78.5 |
| 3,884,857 | 5/1975 | Ballard et al. | 260/87.3 |
| 4,071,581 | 1/1978 | Yokoyama | 526/56 |
| 4,180,637 | 12/1979 | Evani et al. | 526/173 |
| 4,202,955 | 5/1980 | Gaylord | 526/272 |
| 4,250,289 | 2/1981 | Denzinger et al. | 526/272 |

FOREIGN PATENT DOCUMENTS 2840502 3/1980 Fed. Rep. of Germany.

OTHER PUBLICATIONS

"Ethylene Maleic Anhydride Copolymer", *Macromolecular Syntheses*, vol. 1, pp. 42–45, (John Wiley and Sons, Inc., 1963).

*Primary Examiner*—Paul R. Michl
*Assistant Examiner*—A. H. Walker
*Attorney, Agent, or Firm*—Walter C. Danison, Jr.; Denis A. Polyn

[57] ABSTRACT

Interpolymers of α-olefins having at least about 6 carbon atoms and unsaturated carboxylic acids or derivatives thereof, such as maleic anhydride, may be prepared by heating reactive amounts only of the monomers with a free radical initiator, preferably in a solvent-free system and typically at a temperature of at least about 135° C. The time required for polymerization is relatively short under these conditions.

11 Claims, No Drawings

METHOD FOR PREPARING INTERPOLYMERS

This application is a continuation of Ser. No. 370,030, filed Apr. 20, 1982, now abandoned.

This invention relates to methods for preparing interpolymers of various aliphatic α-olefins and unsaturated carboxylic acids or derivatives thereof. In its most general sense, the invention is directed to an improved method for preparing of such interpolymers by free radical methods which comprises carrying out the polymerization reaction at a relatively high temperature, preferably in the absence of solvents and diluents.

Interpolymers of aliphatic α-olefins and various unsaturated carboxylic acids and their derivatives are useful in many ways. For example, corresponding olefinester interpolymers may be prepared by free radical polymerization of α-olefins with esters or by polymerization of said α-olefins with acids, anhydrides or the like followed by esterification of the resulting polymers; they are useful as viscosity modifying additives for lubricating oils. The polymerization is frequently carried out in solution at a temperature above about 80° C. and usually up to about 120° C., typical solvents being saturated aliphatic hydrocarbons, aromatic hydrocarbons, chlorinated hydrocarbons and ketones. Alternatively, an excess of the olefin is sometimes used as the diluent. It is frequently found, however, that the polymerization reaction takes a very long time to go to completion under such conditions. It must frequently be carried out for several days in order to obtain a product of the desired conversion and molecular weight.

A principal object of the present invention, therefore, is to provide an improved method for the preparation of interpolymers of the type described.

A further object is to provide a method for preparing such interpolymers which produces the desired interpolymer product in a relatively short time.

Other objects will in part be obvious and will in part appear hereinafter.

In accordance with these objects, the present invention is generally directed to an improved method for preparing an interpolymer of (A) at least one aliphatic α-olefin having at least about 6 carbon atoms and (B) at least one unsaturated carboxylic acid or derivative thereof copolymerizable with reagent A, said method comprising polymerizing reagents A and B in the presence of (C) a free radical initiator. The improvement contemplated by the invention in its most general sense comprises effecting said polymerization using reagents A and B in reactive amounts only, at a temperature of at least about 135° C. and preferably between about 140° and about 200° C.

The α-olefins useful as reagent A in the method of this invention are those containing at least about 6 and preferably at least about 10 carbon atoms; those containing from about 10 to about 30 carbon atoms are especially preferred. Such olefins are illustrated by 1-hexene, 1-heptene, 1-octene, 2-methyl-1-heptane, 1-nonene, 1-decene, 1-dodecene, 1-tetradecene, 1-hexadecene, 1-octadecene and 1-eicosene. Mixtures of these α-olefins may also be used.

Reagent B is at least one unsaturated carboxylic acid or derivative thereof copolymerizable with reagent A. Suitable acids include acrylic, methacrylic, butenoic, maleic, fumaric and itaconic acids, with the polycarboxylic acids such as maleic, fumaric and itaconic being preferred. The derivatives of these acids include their anhydrides, esters (especially lower alkyl esters, the term "lower" denoting alkyl groups containing up to about 7 carbon atoms), amides and imides. The acids, anhydrides and esters are preferred; maleic and fumaric acid and maleic anhydride, especially the latter, are most often used because of their availability and suitability for preparing interpolymers useful in many ways.

Reagent C is a suitable free radical initiator. Many of such initiators are known in the art; they include various peroxides and azo-type compounds. Examples of suitable peroxides are benzoyl peroxide, lauryl peroxide, di-t-butyl peroxide, 2,4-dichlorobenzyl peroxide, t-butyl hydroperoxide, cumene hydroperoxide, diacetyl peroxide, diethyl peroxycarbonate, t-butyl perbenzoate and the perborates. Suitable azo-type compounds include azobisisobutyronitrile, p-bromobenzenediazonium fluoborate, p-tolyldiazoaminobenzene, p-bromobenzenediazonium hydroxide, azomethane and the phenyldiazonium halides. The peroxides and especially t-butyl peroxide are preferred.

According to one embodiment of the present invention, the interpolymer is prepared by heating a mixture comprising reagents A, B and C at a temperature of at least about 135° C., and preferably from about 140° to about 200° C., until polymerization has taken place to the desired extent. Reagents A and B are used in reactive amounts only; that is, neither reagent is present in excess so as to serve as a diluent for the reaction. Various substantially inert, normally liquid organic diluents may be used, so long as the boiling point thereof is high enough to provide the required reaction temperature. Illustrative diluents are xylene, chlorobenzene and various petroleum fractions boiling above about 135° C. However, the presence of a solvent is usually not necessary and it is generally preferred that the reaction mixture consist of reagents A, B and C; that is, that no other materials be present except as impurities.

In another embodiment of the invention, a mixture consisting of reagents A, B and C, the first two used in reactive amounts only, is heated within a temperature range at which the desired polymerization reaction occurs for a period of time effective to complete said polymerization to the desired degree. As previously noted, this temperature range is normally at least about 135° C. and preferably from about 140° to about 200° C. However, depending on the identity of reagents A and B it may be possible to effect polymerization at lower temperatures. This is particularly desirable when reagent A is a relatively low molecular weight olefin, especially when it contains about 10 carbon atoms or less. If it contains less than about 9 carbon atoms, it may be necessary to conduct the polymerization reaction under pressure, typically autogenous pressure.

If reagent B is acrylic acid or a derivative thereof, caution must be exercised to insure that it does not homopolymerize rather than interpolymerizing with reagent A. Homopolymerization may normally be avoided by adding the acrylic acid slowly to a mixture of the other reagents.

The proportions of reagents A and B used in the method of this invention are not critical. Typically, useful polymers may be obtained when the molar ratio of reagent A to reagent B is between about 0.5:1 and about 1.5:1, preferably between about 0.8:1 and about 1.25:1. Reagent C is used in catalytic amounts known to those skilled in the art.

The method of this invention is illustrated by the following examples. All parts are by weight.

EXAMPLE 1

A mixture of 370 parts (2.2 moles) of a commercially available $C_{12}$ α-olefin and 196 parts (2 moles) of maleic anhydride is heated to 80° C. under nitrogen, with stirring. A solution of 0.5 part of di-t-butyl peroxide in 20 parts of chlorobenzene is added as the temperature is increased. The mixture is stirred at 160°–165° C. for 2½ hours, with further increments of di-t-butyl peroxide (0.1 part, 0.2 parts, 0.2 parts) being added during the heating period. The product is the desired interpolymer.

EXAMPLE 2

A mixture of 168 parts (0.86 mole) of a commercially available $C_{14}$ α-olefin, 98 parts (1 mole) of maleic anhydride and 200 parts of xylene is heated to 135° C. under nitrogen, with stirring. There is added 1.5 parts of a 10% solution of di-t-butyl peroxide in xylene. The mixture is heated with stirring at 135°–140° C. for 4½ hours, with 3 additional 1.5-part portions of the di-t-butyl peroxide solution being added during this period. The mixture is poured slowly into a large excess of textile spirits and stirred for 1 hour, whereupon the desired polymer precipitates and is filtered, washed with xylene and dried under vacuum at 80° C. The inherent viscosity of the resulting polymer (1 gram in 100 ml. of acetone at 30° C.) is 0.068.

EXAMPLE 3

A mixture of 756 parts of a commercially available $C_{18}$ α-olefin and 294 parts (3.0 moles) of maleic anhydride is heated to 80° C. under nitrogen, with stirring, and a solution of 0.6 part of di-t-butyl peroxide in 30 parts of toluene is added. Heating is continued to a temperature of 160° C., at which point an exothermic reaction causes the temperature to rise to 172° C. Heating at 165–175° C. is continued; after 20 minutes, an additional portion of 76 parts of the α-olefin mixture (total 3.25 moles), 15 parts of toluene and 0.9 part of di-t-butyl peroxide is added. Heating at 165–175° C. is continued for a total period of about 3½ hours. The product is the desired interpolymer.

EXAMPLE 4

To 252 parts of the α-olefin of Example 3 is added at 150° C. under nitrogen, with stirring, a solution of 0.2 part of di-t-butyl peroxide in 50 parts of said α-olefin. There is then added over 5½ hours a mixture of 253 parts of the α-olefin (total 2.2 moles), 243 parts (1.9 moles) of butyl acrylate, 9.8 parts (0.1 mole) of maleic anhydride and 1.4 parts of di-t-butyl peroxide. The reaction mixture is maintained at 145°–155° C. during the addition and for an additional ½ hour. An additional 0.2 part of di-t-butyl peroxide is added and the mixture is heated over 2 hours to a maximum temperature of 200° C. It is then vacuum stripped; the residue is the desired interpolymer which has an inherent viscosity (1 gram in 100 ml. of carbon tetrachloride at 30° C.) of 0.064.

EXAMPLE 5

A mixture of 93 parts (0.55 mole) of the α-olefin of Example 1 and 0.4 part of di-t-butyl peroxide is heated to 120° C. under nitrogen, with stirring, and 57 parts of di-n-butyl maleate is added. Heating is continued to 140° C. and an additional 57 parts (total 0.5 mole) of di-n-butyl maleate is added over 3 hours. The mixture is heated at 140°–150° C., with stirring, for 7 hours, with incremental addition of di-t-butyl peroxide (0.2 part, 0.2 part, 0.1 part, 0.1 part, 0.1 part). The mixture is vacuum stripped and the residue is the desired interpolymer; it has an inherent viscosity (1 gram in 100 ml. of carbon tetrachloride at 30° C.) of 0.044.

EXAMPLE 6

To a mixture of 70 parts (0.28 mole) of the α-olefin of Example 3 and 93 parts (0.25 mole) of a di-($C_{8-10}$ alkyl) maleate is added at 200° C., with stirring, 0.2 part of di-t-butyl peroxide. Stirring is continued at 195°–205° C. for 6 hours as 4 additional 0.1-part increments of di-t-butyl peroxide are added. The mixture is then vacuum stripped and the residue is the desired interpolymer; it has a number average molecular weight of 1,300 as determined by vapor pressure osmometry.

EXAMPLE 7

A mixture of 154 parts (0.5 mole) of a commercial mixture of $C_{20-24}$ α-olefins, 25 parts of di-n-butyl maleate and 0.1 part of di-t-butyl peroxide is heated to 150° C. under nitrogen, with stirring, and an additional 100 parts (total 0.55 mole) of di-n-butyl maleate and 0.5 of di-t-butyl peroxide is added over 6 hours. Heating at 150° C. is continued for 12 hours as an additional 7 increments of 0.2 part each of di-t-butyl peroxide are added. The mixture is vacuum stripped. The residue is the desired interpolymer; it has a number average molecular weight of 1,700 as determined by vapor pressure osmometry.

EXAMPLE 8

A mixture of 302 parts of the α-olefin of Example 3 and 0.2 part of di-t-butyl peroxide is heated to 150° C. under nitrogen, with stirring, and there is added a mixture of 253 parts (total 2.2 moles) of the α-olefin, 243 parts (1.9 moles) of n-butyl acrylate, 11.6 parts (0.1 mole) of 2-hydroxyethyl acrylate and 1.4 parts of di-t-butyl peroxide. The addition period is 7 hours and the temperature of addition is 140°–150° C. Heating is continued at this temperature for 2 hours, during which time an additional 0.2 part of di-t-butyl peroxide is added. The temperature is increased over 2 hours to 200° C. The mixture is vacuum stripped and the residue is the desired interpolymer; it has an inherent viscosity (0.5 gram in 100 ml. of carbon tetrachloride at 30° C.) of 0.067.

What is claimed is:

1. In a method for preparing an interpolymer of reagent (A) at least one aliphatic alpha-olefin having a least six (6) carbon atoms and reagent (B) at least one unsaturated carboxylic acid or derivative thereof copolymerizable with reagent A, which method comprises polymerizing reagent A and reagent B in the presence of reagent (C) a free radical initiator:

the improvement which comprises effecting said polymerization by heating a mixture comprising reagents A, B and C, the first two used in reactive amounts only such that neither reagent is present in excess so as to serve as a diluent for the reaction, at a temperature of at least about 135° C., mixture being characterized by the absence of a solvent or diluent.

2. A method according to claim 1 wherein the polymerization temperature is from about 140° to about 200° C.

3. In a method for preparing an interpolymer of (A), at least one alpha-olefin having at least about 10 carbon atoms and (B) at least one unsaturated carboxylic acid or derivative thereof copolymerizable with reagent A, which method comprises polymerizing reagents A and B in the presence of (C) a free radical initiator: the improvement which comprises effecting said polymerization by heating a mixture consisting essentially of reagents A, B and C, the first two used in reactive amounts only, such that neither reagent is present in excess so as to serve as a diluent for the reaction, at a temperature which said polymerization occurs for a period of time effective to complete said polymerization to the desired degree, said mixture being characterized by the absence of a solvent or diluent.

4. A method according to claim 3 wherein the polymerization temperature is from about 140° to about 200° C.

5. A method according to any one of claims 1–4 wherein reagent A contains from about 10 to about 30 carbon atoms.

6. A method according to claim 5 wherein reagent B is an acid, anhydride or ester.

7. A method according to claim 6 wherein reagent C is a peroxide.

8. A method according to claim 7 wherein reagent B is a dicarboxylic acid or an anhydride or ester thereof.

9. A method according to claim 8 wherein reagent B is maleic acid, fumaric acid or maleic anhydride.

10. A method according to claim 9 wherein reagent B is maleic anhydride.

11. A method according to claim 10 wherein reagent C is di-t-butyl peroxide.

* * * * *